(12) United States Patent
Boyer (10) Patent No.: US 6,880,037 B2
(45) Date of Patent: Apr. 12, 2005

(54) METHOD OF DATA CACHING ON A SMARTCARD

(75) Inventor: John Boyer, Ottawa (CA)

(73) Assignee: ActivCard, Inc., Fremont, CA (US)

( * ) Notice: Subject to any disclaimer, the term of this patent is extended or adjusted under 35 U.S.C. 154(b) by 263 days.

(21) Appl. No.: 10/216,742

(22) Filed: Aug. 13, 2002

(65) Prior Publication Data

US 2004/0034734 A1 Feb. 19, 2004

(51) Int. Cl.$^7$ .............................................. G06F 12/00
(52) U.S. Cl. ...................................... 711/103; 711/115
(58) Field of Search ................................. 711/103, 155, 711/115; 235/492, 380

(56) References Cited

U.S. PATENT DOCUMENTS

| | | | | |
|---|---|---|---|---|
| 5,360,277 | A | * | 11/1994 | Matsubara et al. ............. 400/68 |
| 6,151,541 | A | * | 11/2000 | Iizuka ............................ 701/51 |
| 6,438,565 | B1 | * | 8/2002 | Ammirato et al. ............ 715/503 |
| 2003/0059210 | A1 | * | 3/2003 | Ando et al. .................... 386/98 |
| 2003/0236110 | A1 | * | 12/2003 | Beaulieu et al. ................ 463/1 |

* cited by examiner

*Primary Examiner*—Hiep T. Nguyen
(74) *Attorney, Agent, or Firm*—Freedman & Associates (57) ABSTRACT

Smartcards are gaining acceptance as a secure medium for storing information, typically of a personal and confidential nature. Unfortunately, the process of storing information to the smartcard is a time consuming task, often taking much longer than to read the same amount of information from the card. The non-volatile memory within the smartcard is typically of the FLASH type and does not facilitate fast writing a fast writing process thereto. In order to speed up this process, a comparative writing algorithm is utilized which only writes changed data to the smartcard memory, thus eliminating the need for storing duplicate information.

30 Claims, 5 Drawing Sheets

Compare data for storage within the smartcard memory with data retrieved from the smartcard memory to detect differences therebetween Write each portion of the data corresponding to a portion from a first changed data element to a last changed data element and having fewer than M contiguous unchanged data elements therein to the smart card memory

Providing a data write request from the host computer system to the smartcard including an indication of a location in which the data is to be stored and an amount of data to be stored Transmitting a number of bytes from the host computer system to the smartcard indicative of a write operation and data relating to addresses to which to store the data Completing the write operation before the smartcard is removed from the interface

AaBbCcDdEeFfGgHhIiJjKkLlMmNnOoPpQqRrSsTtUuVvWwXxYyZz
Aa--CcD-EeFf-gHhIi-jKkLlMmNnOoPp-qRrSsTtUuV----xYyZz

Fig. 5a

AaBbCcDdEeFfGgHhIiJjKkLlMmNnOoPpQqRrSsTtUuVvWwXxYyZz
AaBbCcDdEeFfGgHh--------------PpQqRrSsTtUuVvWwXxYyZz

Fig. 5b

AaBbCcDdEeFfGgHhIiJjKkLlMmNnOoPpQqRrSsTtUuVvWwXxYyZz
AaBbCcDdEe--GgHhI---jKkLl--NnOoPpQqRrSsTtUuVvWwXxYyZz

Fig. 5c

AaBbCcDdEeFfGgHhIiJjKkLlMmNnOoPpQqRrSsTtUuVvWwXxYyZz
-aBbCcDdEeFfGgHhIiJjKkLlMmNnOoPpQqRrSsTtUuVvWwXxYy-z

```
┌─────────────────────────────────────────┐
│ Compare data for storage within the smartcard │
│ memory with data retrieved from the smartcard │
│ memory to detect differences therebetween │
└─────────────────────────────────────────┘
                    │
                    ▼
┌─────────────────────────────────────────┐
│ Write each portion of the data corresponding to │
│ changed data and less than the whole of the data │
│ to the smart card memory independently │
└─────────────────────────────────────────┘
```

Fig. 7

```
┌─────────────────────────────────────────┐
│ Compare data for storage within the smartcard │
│ memory with data retrieved from the smartcard │
│ memory to detect differences therebetween │
└─────────────────────────────────────────┘
                    │
                    ▼
┌─────────────────────────────────────────┐
│ Write each portion of the data corresponding to a │
│ portion from a first changed data element to a last │
│ changed data element and having fewer than M │
│ contiguous unchanged data elements therein to the │
│ smart card memory │
└─────────────────────────────────────────┘
```

Fig. 8

METHOD OF DATA CACHING ON A SMARTCARD

FIELD OF THE INVENTION

This invention relates to storing data within smartcards and more specifically to the area of storing data within smartcard memory that is other than the data already stored within the memory.

BACKGROUND OF THE INVENTION

Smartcards are gaining acceptance in our society, especially with the increasing need for authorized: authentication, storing values and storing personalized information. Authentication is concerned with ensuring that only authorized individuals gain access to systems and buildings. A smartcard can be used as an electronic wallet to store units of different currency denominations, as well as acting as a credit card. Values can be replenished on a smartcard. The smartcard is capable of holding a large amount of data of different forms and for different purposes but usually of a personal nature.

Smartcard (SC) technology has allowed for storing of secure information within an integrated circuit card. The secure information is stored in such a format that software keys and certificates are required for authentication purposes before information is retrieved. An encoding standard, known as PKCS15 dictates how these keys and certificates are represented in terms of smartcard files and directories. The format securely controls external access to files and directories on the smartcard during the process of encoding information, or reading information from the smartcard.

Each of the directory files: Private Key, Public Key, Secret Key, Certificate or Data Object, occupy a non volatile array of addressable memory within the smartcard. Typically this array of non-volatile array addressable memory is of the EEPROM type with memory sizes from 8 kb up to 32 kb. Directories on the SC are addressable using an interface system. The smartcard is inserted into an interface system, such that the interface system interacts with the information within the directory files on the smartcard, providing and storing the necessary information pertinent to a nature of a transaction within the interface system.

If the interface system is used for monetary purchases, then typically prior to transaction, pertinent information is first read into cache memory within the interface system. It is within this cache memory that the system reads stored smart cart used identities, accounts and balances, which will be used for purchases made during the transaction.

Once a purchase is complete and the transaction has ended, pertinent information is written back to the non-volatile memory within the smartcard, such that an appropriate record of the transaction is stored. Unfortunately, writing of the same length of information back to the smartcard takes a longer amount of time than reading of the same information form the smartcard. Non-volatile, EEPROM or FLASH memory is quite slow when it comes to writing to, as comparison to volatile memory. Typically information is stored in complete files on the smartcard. As a result when updates of information are made on the smartcard, the interface requires significantly more time in order to save changed files back to the smartcard It is therefore an object of this invention to provide a method of writing data to smartcard files in such a manner so as to decrease the amount time the interface system spends in saving data to the card by using a comparative writing approach.

SUMMARY OF THE INVENTION

In accordance with the invention there is provided a method of storing changed information within a non-volatile memory of a smartcard comprising the steps of: caching data from within the smartcard, the cached data stored in a location in memory other than memory within the smartcard; providing data for storage within the smartcard; comparing the provided data for storage to at least a portion of the cached data retrieved one of directly and indirectly from the location to determine a data portion thereof less than the whole and having therein changed data; and, writing the determined data portion less than the whole to the smartcard.

In accordance with another aspect of the invention there is provided an apparatus for storing changed information within a non-volatile memory of a smartcard comprising: a memory having a first and a second memory locations and other than within a smartcard; a processor for reading data from the smartcard memory, for storing the read data into the first memory location, for copying a portion of the data from the first memory location and storing modified data in the second memory location, and for comparing the data stored within the first memory location to the data stored within the second memory location and storing within the smartcard memory at least a portion of the modified data that is different, the at least a portion being less than the whole of the read data.

In accordance with yet another aspect of the invention there is provided a storage medium having stored thereon data indicative of a plurality of instructions for performing the steps of: caching data from within a smartcard, the cached data stored in a location in memory other than memory within the smartcard; providing data for storage within the smartcard at locations from which the cached data was retrieved; comparing the provided data for storage to at least a portion of the cached data retrieved one of directly and indirectly from the location to determine a data portion less than the whole and having therein changed data; and, writing the determined data portion to the smartcard.

BRIEF DESCRIPTION OF THE DRAWINGS

The invention will now be described with reference to the drawings in which.

DETAILED DESCRIPTION OF THE INVENTION

Figure 1:
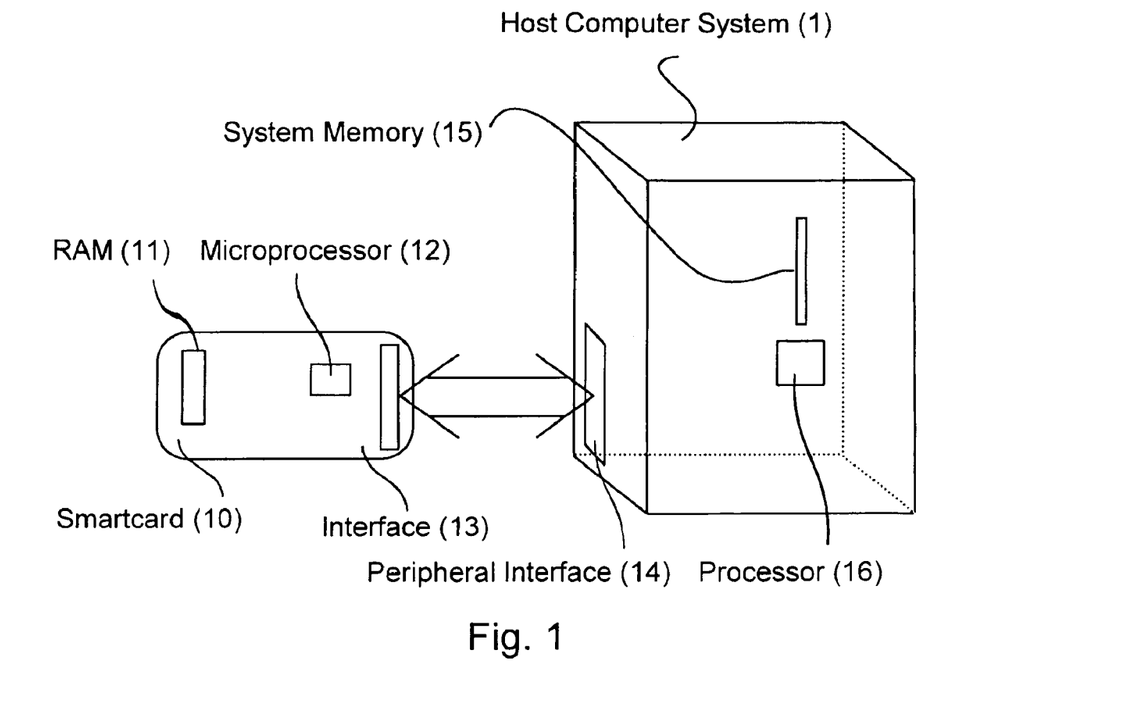
FIG. 1 illustrates smartcard and interface system for reading and writing of information to the smartcard non volatile memory.

FIG. 1, illustrates a smartcard 10 coupled with a host computer system 1. The host computer system 1 comprises memory in the form of random access memory (RAM) 15, a processor in the form of a microprocessor 16, and a peripheral interface 14 for coupling with an interface of a smartcard.

The smartcard 10 comprises memory in the form of random access memory (RAM) 11, a processor in the form of a microprocessor 12, and a smartcard interface 13 for coupling with the peripheral interface 14 of the host computer system 1. As such, data is retrieved from the smartcard memory 11 into the host processor system memory 15 for processing by the host computer system processor 16. Once processed, data is stored from the host computer system back to the smartcard via coupled interfaces 13 and 14.

Figure 2A:
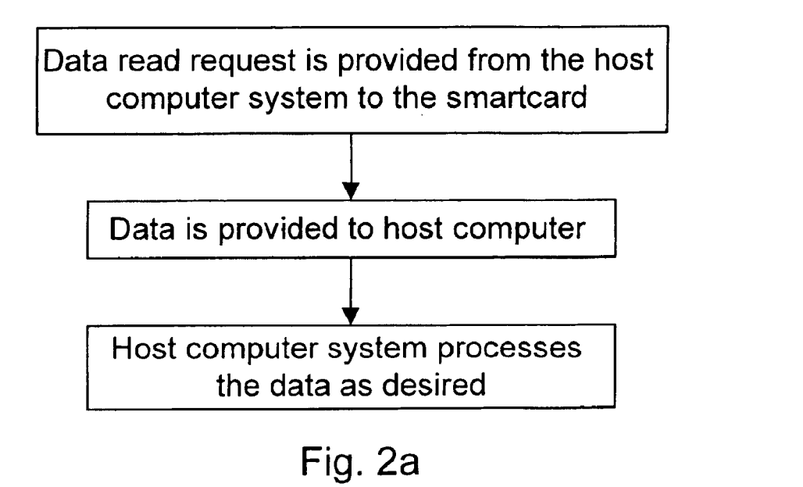
FIG. 2a illustrates in flow diagram steps performed by a host computer system to read data from a smartcard.

FIG. 2a shows in flow diagram steps performed by the host computer system 1 to read data from the smartcard 10. First a data read request is provided from the host computer system 1 to the smartcard 10 including an indication of a location of the data to be read and an amount of data to be read. For example, the indication is in the form of a start address and a length. Alternatively, the indication includes a start and end address. Further alternatively, the indication includes an identifier recognizable to the smartcard and some offset and length data relating thereto.

Of course, once the data is provided to the host computer system, the host computer system is able to process the data as desired including modifying the data, retransmitting the data, duplicating the data and so forth.

Of course, it is well known in the art of data manipulation and caching that typical read operations have some overhead associated therewith. Here, the overhead includes transmitting a number of bytes from the host computer system to the smartcard indicative of a read operation and data relating to addresses from which to read data. Thus, if a read lookup operation has a latency of zero clock cycles and a read and write cycle time is identical, in order to read 50 bytes requires 50 read clock cycles plus N write clock cycles–one per byte of data for indicating a read operation and address data. This results in a total of 50+N cycles.

When the number of bytes read is 5 bytes, the value of N forms a significantly larger proportion of the total read operation time. Thus, larger read operations are advantageous over smaller ones.

Figure 2B:
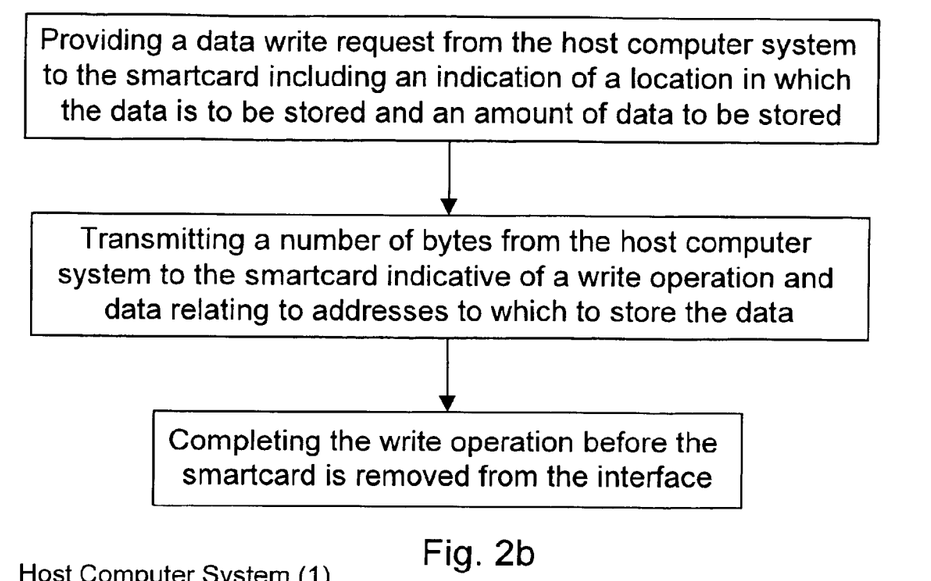
FIG. 2b illustrates in flow diagram steps performed by a host computer system to write data to a smartcard.

FIG. 2b shows in flow diagram steps performed by the host computer system 1 to write data to the smartcard 10. First a data write request is provided from the host computer system 1 to the smartcard 10 including an indication of a location in which the data is to be stored and an amount of data to be stored. For example, the indication is in the form of a start address and a length. Alternatively, the indication includes a start and end address. Further alternatively, the indication includes an identifier recognizable to the smartcard and some offset and length data relating thereto.

Of course, it is well known in the art of data manipulation and caching that typical write operations have some overhead associated therewith. Here, the overhead includes transmitting a number of bytes from the host computer system to the smartcard indicative of a write operation and data relating to addresses to which to store the data. Thus, if a write lookup operation has a latency of zero clock cycles and a read and write cycle time is identical, in order to write 50 bytes requires 50 write clock cycles plus N write clock cycles–one per byte of data for indicating a write operation and address data. This results in a total of 50+N cycles.

When the number of bytes written is 5 bytes, the value of N forms a significantly larger proportion of the total write operation time. Thus, larger write operations are advantageous over smaller ones.

Further, the interface with the smartcard is typically slow and, as such, it is desirable to perform read and write operations as background tasks. That said, write operations must be completed before a smartcard 10 is removed from the interface 14.

Figure 3:
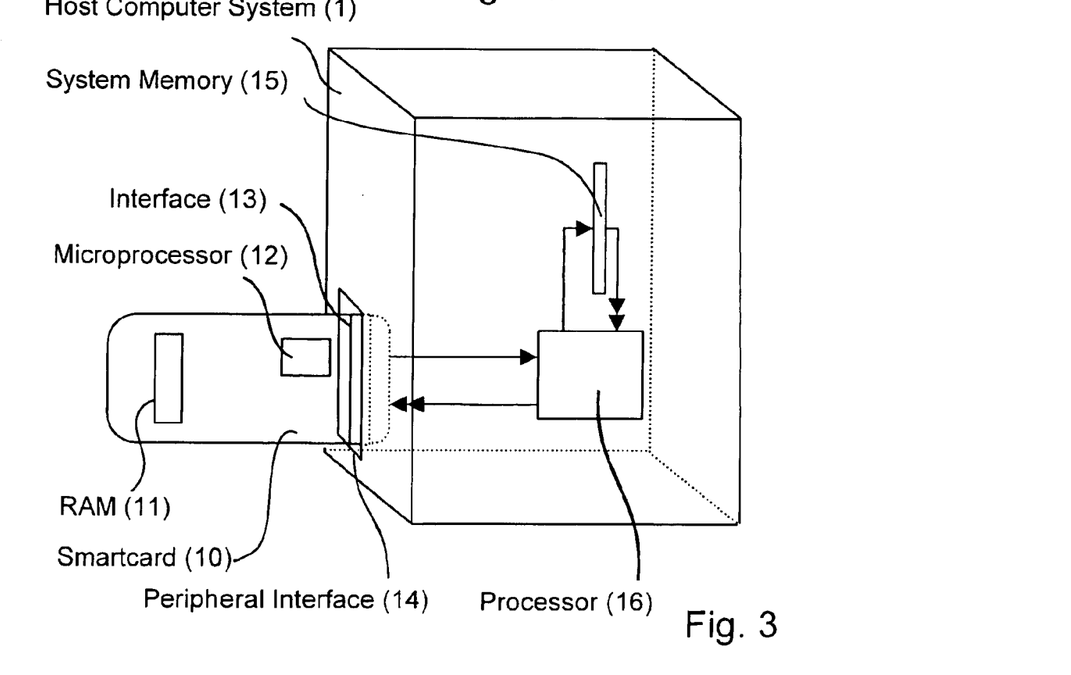
FIG. 3 illustrates two alphanumeric strings being compared in cache memory prior to storage within smartcard memory.

Referring to FIG. 3, a read-write operation is shown for use with a smartcard 10. The A smartcard session is initiated when the smartcard 10 is inserted into the host computer system 1 with the smartcard interface 13 coupled with the peripheral interface 14, and closed when a transaction within the host computer system 1 is brought to an end and the card is ejected from the host computer system. Here, the smartcard 10 is interfaced with the host processor 16. Data stored within the smartcard is read into a memory cache 15 for access by the host processor 16. The host processor accesses the cached data and operates thereon to result in modified data. The modified data is then written back to the smartcard memory to replace the data read therefrom.

For example, if a user logs onto a computer network using security data stored within a smartcard, the security data is read into cache memory for use in accessing the network. Typically, statistical data associated with the security data such as last login attempt information is modified and the security data is rewritten to the smartcard.

In general, when a smartcard session is initiated, data pertinent to the type of session is read from files within the smartcard 10 non-volatile memory 11. This data is read and cached by the processor 16 into a first memory location in cache memory 15, within the host computer system 1. Data is read into cache memory 15 since further processing operations will take place on the data, and having the data cached in volatile memory allows the processor 16 to quickly operate on the data. Slow access time prohibits mathematical operations on data that has not been first read into cache memory 15.

The Processor 16 operations on the cached data can be numerous in dependence upon the nature of the session. If the session is for the purchasing of an item, then files pertinent to the session, such as monetary balances and accounts are read by the processor 16 from the appropriate memory locations within non-volatile smartcard memory 11 into the first memory location within system memory 15. If the transaction is for authorization purposes then names and passwords are read into the first memory location within cache memory. The nature of the session dictates which information is read, and which information is altered within a second location in cache memory pertaining to data for storage.

Once the session is closed, data for storage, stored within a second location, is ready to be updated on the card to reflect account balances or changes in passwords, or other parameters updated in the session.

Figure 4:
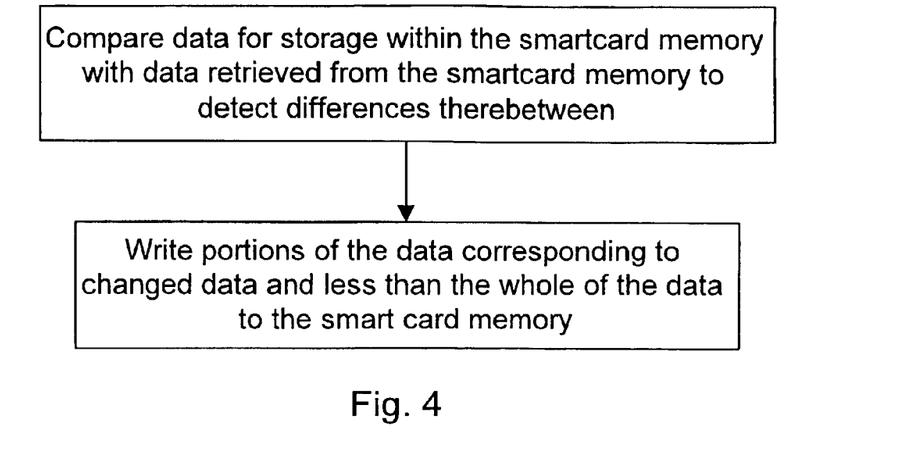
FIG. 4 is a simplified flow diagram of an embodiment of a method according to the invention.

Referring to FIG. 4, a method of storing data within the smartcard memory is shown in flow diagram. Here, the data is assumed to have originated from the smartcard memory. After modification, the data is to be rewritten to the smartcard. Prior to executing a write operation, a comparison is executed by the processor 16 in order to compare the data read from the smartcard and the data currently in memory for storage within the smartcard. If only altered data portions are provided to the smartcard for storage, then the process reduces the amount of data which needs to be written back to the non volatile smartcard memory. Since the smartcard interface and memory are slow, this saves significant time in the write-back process.

Referring to FIGS. 5a, 5b, 5c, and 5d, a string of data is shown as read from the smartcard in the top line and as modified for storage thereto in the second line. All changed data characters are shown as "–" for ease of detection. A plurality of more specific embodiments of the method of FIG. 4 are explained below with reference to the strings of FIGS. 5a through 5d.

Figure 5A:
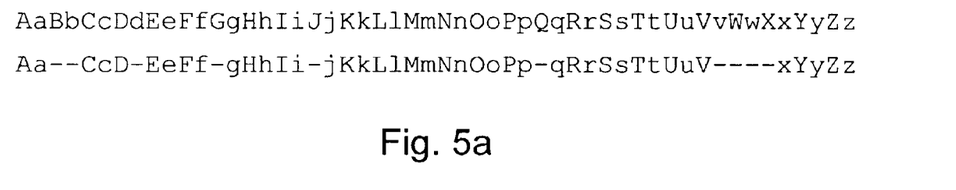
FIGS. 5a, 5b, 5c, and 5d illustrate examples of data cached from a smartcard and that to be written for comparison according to the invention.
Figure 5B:
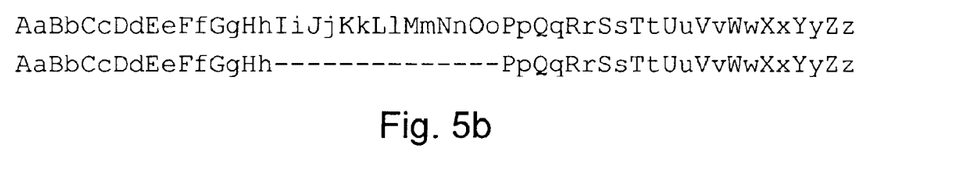
Figure 5C:
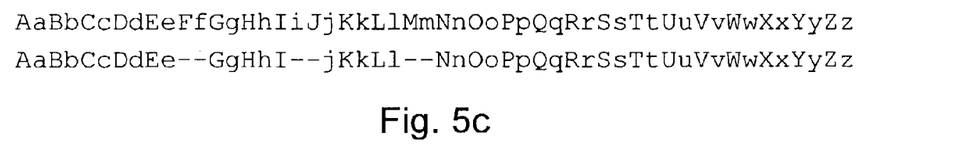
Figure 5D:
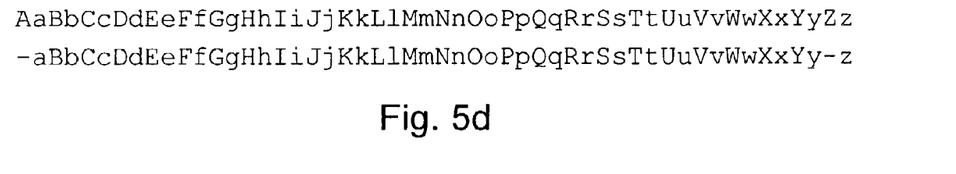
Figure 6:
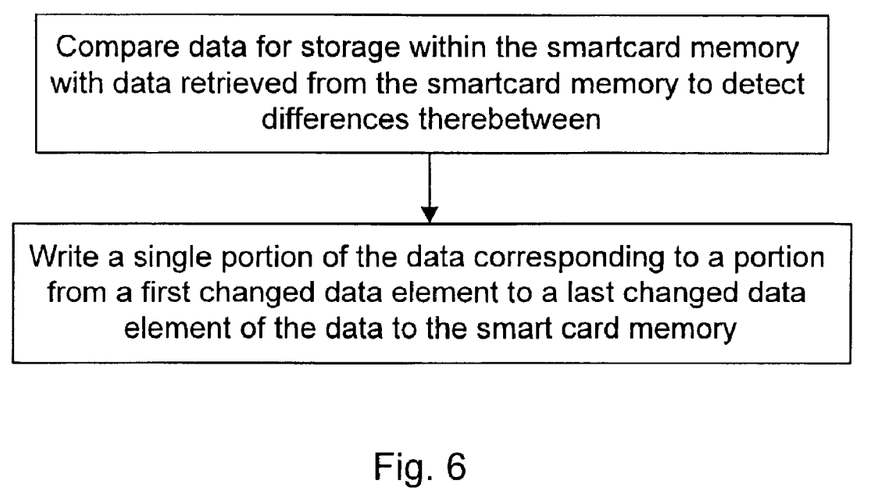
FIG. 6 is a simplified flow diagram of an embodiment of another method according to the invention.

Referring to FIG. 6, a method according to the invention wherein only the portion of the data encompassing the first changed byte to the last changed byte is stored to the smartcard. Thus, the data before a first changed byte and after a last changed byte is excluded from the write operation thereby reducing a write time for the data. Referring to the data of FIG. 5a, this results in 7 fewer bytes of a total of 52 bytes being written. If the overhead is 5 bytes, the resulting operation requires 50 bytes instead of 57 bytes for a better than 10% savings. Referring to FIG. 5b, only a centre 14 bytes need to be stored to the smartcard thereby requiring, for the above noted overhead, 19 byte transfers instead of 57 for a savings of ⅔. Referring to FIG. 5c, only a centre 16 bytes need to be stored to the smartcard thereby requiring, for the above noted overhead, 21 byte transfers instead of 57 for a savings of almost ⅔. Referring to FIG. 5d, 51 bytes need to be stored to the smartcard thereby requiring, for the above noted overhead, 56 byte transfers instead of 57 for a nominal savings. That said, in each of the above cases, a savings results.

Figure 7:
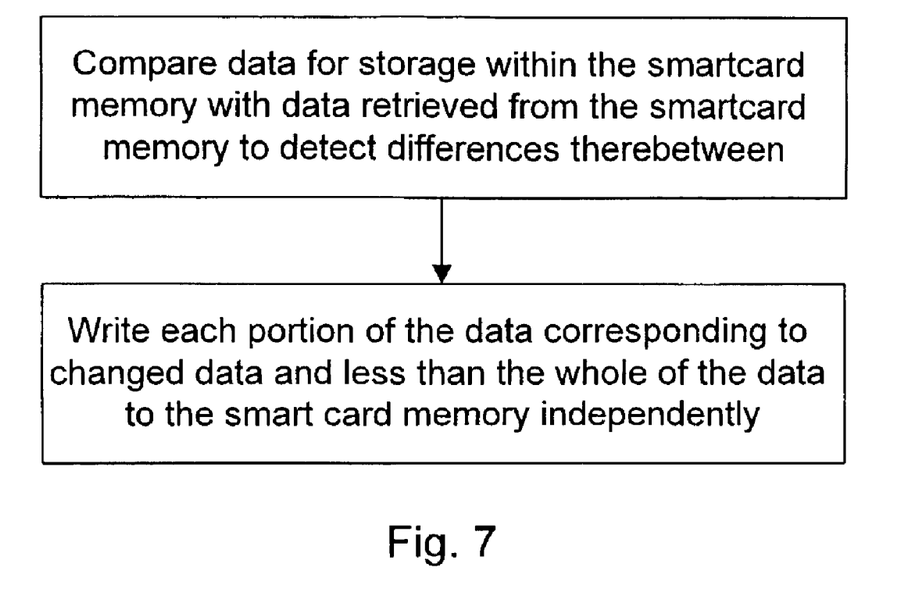
FIG. 7 is a simplified flow diagram of an embodiment of a further method according to the invention; and, FIG. 8 is a simplified flow diagram of an embodiment of yet another method according to the invention.

Referring to FIG. 7, a method according to the invention wherein each portion of the data encompassing a first changed byte to a last contiguous changed byte is stored to the smartcard. Thus, the data between changed bytes is excluded from the write operation thereby reducing a write time for the data. Referring to the data of FIG. 5a, this results in 6 write operations for 2, 1, 1, 1, 1, and 4 bytes respectively. Thus, using the above overhead example, the resulting number of bytes transferred to the smartcard is (6×5)+2+1+1+1+1+4=40 bytes as compared to the 57 bytes without employing the inventive method. This has a savings of about ⅓. Referring to FIG. 5b, only a centre 14 bytes need to be stored to the smartcard thereby requiring, for the above noted overhead, 19 byte transfers instead of 57 for a savings of ⅔. Referring to FIG. 5c, only three portions requiring storage including three portions of two bytes each. Thus, (5+2)×3 or 21 bytes are written to the smartcard. This is better than a 50% savings. Referring to FIG. 5d, only two bytes need to written as two separate portions requiring (5+1)×2 or 12 bytes to be stored to the smartcard. Once again savings are realized in each case.

Figure 8:
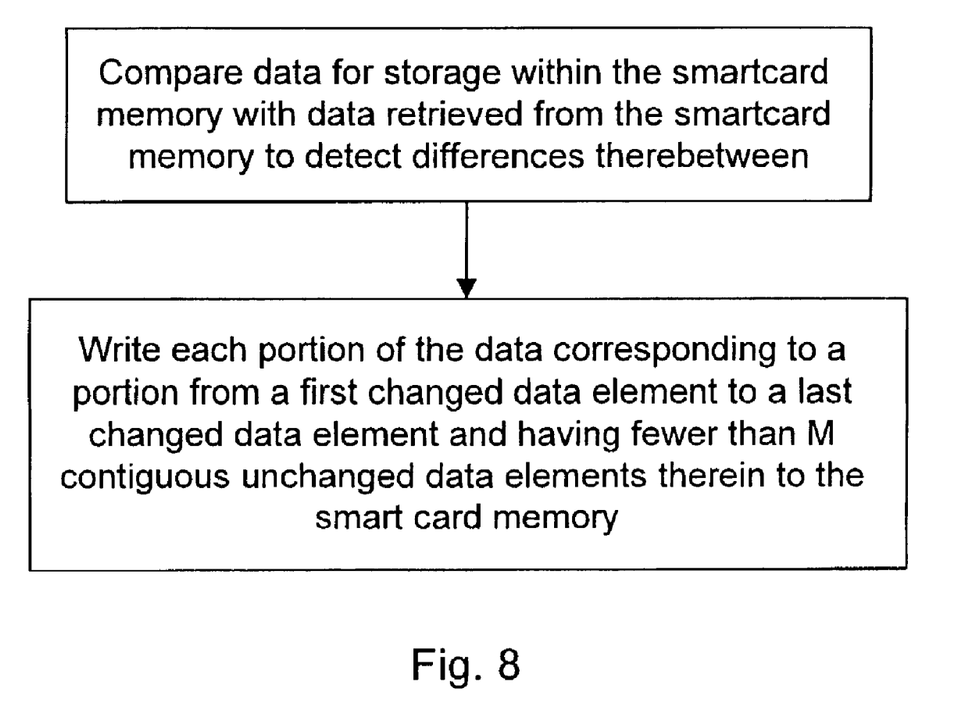

Referring to FIG. 8, a method according to the invention wherein each portion of the data encompassing a first changed byte to a last contiguous changed byte is stored to the smartcard and wherein portions separated by fewer than M unchanged bytes are considered contiguous. Thus, the data between changed bytes is only excluded from the write operation when sufficient unchanged bytes exists therebetween thereby reducing a write time for the data. In the examples below, M is set to 6 though it is readily apparent to those of skill in the art that M is determined based on the overhead and other delays in performing write operations. Referring to the data of FIG. 5a, this results in 3 write operations for 16, 1, and 4 bytes respectively. Thus, using the above overhead example, the resulting number of bytes transferred to the smartcard is (3×5)+16+1+4=36 bytes as compared to the 57 bytes without employing the inventive method. This has a savings of about ⅓. Referring to FIG. 5b, only a centre 14 bytes need to be stored to the smartcard thereby requiring, for the above noted overhead, 19 byte transfers instead of 57 for a savings of ⅔. Referring to FIG. 5c, only one portions requiring storage including 16 bytes. Thus, (5+16) or 21 bytes are written to the smartcard. This is better than a 50% savings. Referring to FIG. 5d, only two bytes need to written as two separate portions requiring (5+1)×2 or 12 bytes to be stored to the smartcard. Once again savings are realized in each case. By selecting M appropriately, it is possible to ensure maximum savings for a given system and smartcard combination.

For instance if the transaction is financial in nature then account information need not be stored again to the smartcard, and perhaps only the updated balance. In this case depending upon the amount of money spent, only three digits may require change as opposed to ten, providing an immediate time savings for the actual data storage portion of the process of 70%.

Statistically, most times only a small portion of data will be changed on the card after a single session. Re-writing of information already stored on the card is waste of time, and there is no need to write the information again since it is already stored in non-volatile memory and does not require updating.

Typically, large amounts of data are infrequently stored to smartcard memory in one session. At smartcard initiation time, a large amount of data are written to the card to initialize the directories as well as to initialize the user profile and to store information pertinent to the profile. This is usually done by an institution, which is providing the card to the user. At initialization time, comparing and storing of data on the smartcard would not create a time savings because of the nature of the initialization and the uniqueness of all data being stored. The process of caching data is more applicable when used by individuals for transactions such as purchases or access, where only a portion of data needs to be quickly modified on the smartcard in order to make a record of the transaction.

Of course, though bytes are used in the above examples, the data write operation is typically optimized for at least a predetermined number of bits, bytes, or words of data and typically, that optimized predetermined amount of data is compared.

Numerous other embodiments may be envisaged without departing from the spirit or scope of the invention.

What is claimed is:

1. A method of storing changed information within a non-volatile memory of a smartcard comprising:

caching data from within the smartcard, the cached data stored in a location in memory other than memory within the smartcard;

providing data for storage within the smartcard;

comparing the provided data for storage to at least a portion of the cached data retrieved one of directly and indirectly from the location to determine a data portion thereof less than the whole and having therein changed data; and writing the determined data portion less than the whole to the smartcard.

2. A method of storing changed information according to claim 1, wherein writing comprises the steps of: executing a write command for writing data consisting of the data portion less than the whole to the smartcard.

3. A method of storing changed information according to claim 1, wherein comparing is performed for determining at least a varied range of data having differences therebetween, and wherein the portion of the data less than the whole includes the at least a varied range.

4. A method according to claim 3, comprising determining a distance between two varied ranges of the at least a varied range within the data for storage and when the distance is less than a distance of N units, including the data between the two varied ranges and the two varied ranges as a single varied range.

5. A method according to claim 4, wherein each determined varied range is written to the smartcard with a different write operation.

6. A method according to claim 3, wherein each determined varied range is written to the smartcard with a different write operation.

7. A method of storing changed information according to claim 1, wherein the portion is a byte.

8. A method of storing changed information according to claim 1, wherein the portion is data from a first changed byte to a last changed byte and excluding some of the data at least one of before the first changed byte and after the last changed byte.

9. A method of storing changed information according to claim 8, wherein writing comprises the steps of: executing a write command for writing data consisting of the data from a first changed byte to a last changed byte.

10. A method of storing changed information according to claim 1, wherein the compared data portion is a smallest writable data unit and wherein when two portions are other than identical and are spaced apart less than a distance of N smallest writable data units, the two portions and data therebetween are stored as the determined portion.

11. A method according to claim 10, wherein a time to write a unit of data to the smartcard is T1 and a time to set up a write operation is T2 and wherein $(N)(T1)>=T2$.

12. A method of storing changed information according to claim 10, wherein writing comprises the steps of: executing a write command for writing data consisting of the data stored as the determined portion.

13. A method of storing changed information according to claim 7, wherein the provided data is derived from the cached data.

14. A method of storing changed information according to claim 13, wherein the provided data is stored in cache memory at a different location than the cached data prior to writing thereof to the smartcard.

15. A method of storing changed information according to claim 1, wherein comparing data is performed by a processor.

16. An apparatus for storing changed information within a non-volatile memory of a smartcard comprising:
  a memory having a first and a second memory locations and other than within a smartcard;
  a processor for reading data from the smartcard memory, for storing the read data into the first memory location, for copying a portion of the data from the first memory location and storing modified data in the second memory location, and for comparing the data stored within the first memory location to the data stored within the second memory location and storing within the smartcard memory at least a portion of the modified data that is different, the at least a portion being less than the whole of the read data.

17. An apparatus for storing changed information according to claim 16, wherein the compared data is a smallest writable data unit.

18. An apparatus for storing changed information according to claim 17, wherein the smallest writable data unit is a byte.

19. A processor readable storage medium having a set of instructions stored therein, which when executed by a processing unit, causes:
  caching data from within a smartcard, the cached data stored in a location in memory other than memory within the smartcard;
  providing data for storage within the smartcard at locations from which the cached data was retrieved;
  comparing the provided data for storage to at least a portion of the cached data retrieved one of directly and indirectly from the location to determine a data portion less than the whole and having therein changed data; and
  writing the determined data portion to the smartcard.

20. A processor readable storage medium according to claim 19, wherein the data relating to writing is indicative of writing data consisting of the data portion less than the whole to the smartcard.

21. A processor readable storage medium according to claim 19, wherein the data indicative of comparing is indicative of determining at least a varied range of data having differences therebetween, and wherein the portion of the data less than the whole includes the at least a varied range.

22. A processor readable storage medium according to claim 21, comprising data stored within the storage medium and relating to determining a distance between two varied ranges of the at least a varied range within the data for storage and when the distance is less than a distance of N units, including the data between the two varied ranges and the two varied ranges as a single varied range.

23. A processor readable storage medium according to claim 22, wherein the data relating to instructions is relating to instructions that when performed result in each determined varied range being written to the smartcard with a different write operation.

24. A processor readable storage medium according to claim 21, wherein the data relating to instructions is relating to instructions that when performed result in each determined varied range being written to the smartcard with a different write operation.

25. A processor readable storage medium of storing changed information according to claim 19, wherein the portion is a byte.

26. A processor readable storage medium of storing changed information according to claim 19, wherein the data relating to instructions is relating to instructions that when performed result in the portion being data from a first changed byte to a last changed byte and excluding some of the data at least one of before the first changed byte and after the last changed byte.

27. A processor readable storage medium of storing changed information according to claim 26, wherein the data relating to writing is indicative executing a write command for writing data consisting of the data from a first changed byte to a last changed byte.

28. A processor readable storage medium of storing changed information according to claim 19, wherein the data relating to instructions is relating to instructions that when performed result in the compared data portion being a multiple of a smallest writable data unit and when two portions are other than identical and are spaced apart less than a distance of N smallest writable data units, the two portions and data therebetween are stored as the determined portion.

29. A processor readable storage medium according to claim 28, wherein a time to write a unit of data to the smartcard is T1 and a time to set up a write operation is T2 and wherein (N)(T1)>=T2.

30. A processor readable storage medium according to claim 28, wherein the data relating to writing comprises the data relating to: executing a write command for writing data consisting of the data stored as the determined portion.

* * * * *